(12) United States Patent
Huang

(10) Patent No.: US 9,091,900 B2
(45) Date of Patent: Jul. 28, 2015

(54) ELECTRO-OPTIC MODULATOR

(71) Applicant: Hon Hai Precision Industry Co., Ltd., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 147 days.

(21) Appl. No.: 13/736,954

(22) Filed: Jan. 9, 2013

(65) Prior Publication Data

US 2014/0147073 A1 May 29, 2014

(30) Foreign Application Priority Data

Nov. 28, 2012 (TW) .............................. 101144608 A

(51) Int. Cl.
| | | |
|---|---|---|
| *G01F 1/22* | (2006.01) | |
| *G02B 6/12* | (2006.01) | |
| *G02F 1/225* | (2006.01) | |

(52) U.S. Cl.
CPC ........ *G02F 1/225* (2013.01); *G02B 2006/1204* (2013.01); *G02B 2006/12142* (2013.01)

(58) Field of Classification Search
CPC ............. G02B 2006/1204; G02B 2006/12142; G02F 1/225
See application file for complete search history.

(56) References Cited

U.S. PATENT DOCUMENTS

| | | | | |
|---|---|---|---|---|
| 4,866,406 | A  * | 9/1989 | Minakata et al. ............. | 359/315 |
| 2002/0154846 | A1* | 10/2002 | Nolan et al. .................... | 385/14 |
| 2010/0027935 | A1* | 2/2010 | Shiraishi .......................... | 385/2 |

* cited by examiner

*Primary Examiner* — Jerry Rahll
(74) *Attorney, Agent, or Firm* — Novak Druce Connolly Bove + Quigg LLP

(57) ABSTRACT

An electro-optic modulator includes a substrate and a Y-shaped waveguide. The substrate has a top surface. The Y-shaped waveguide is formed in the top surface and includes a non-modulated branch and a modulated branch. The substrate defines two grooves in the top surface, separating the non-modulated branch and the modulated branch.

15 Claims, 2 Drawing Sheets

ELECTRO-OPTIC MODULATOR

BACKGROUND

1. Technical Field

The present disclosure relates to integrated optics, and particularly to an electro-optic modulator.

2. Description of Related Art

Electro-optic modulators, such as Mach-Zehner electro-optic modulators, change a refractive index of a branch of a Y-shaped waveguide (hereinafter the modulated branch) using a modulating electric field, utilizing an electro-optic effect. Thus, the modulator can alter a phase of lightwaves traversing the modulated branch. As a result, the lightwaves traversing the modulated branch have a phase shift and thus interfere with lightwaves traversing another branch of the Y-shaped waveguide (hereinafter the non-modulated branch). An output of the Y-shaped waveguide is modulated as the output depends on the phase shift, which in turn depends on the modulating electric field. To avoid too much insertion loss, a divergent angle between the branches of the Y-shaped waveguide is relative small. As such, the two branches are close to each other, which may cause crosstalk between the lightwaves traversing both branches of the Y-shaped waveguide.

Therefore, it is desirable to provide an electro-optic modulator, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
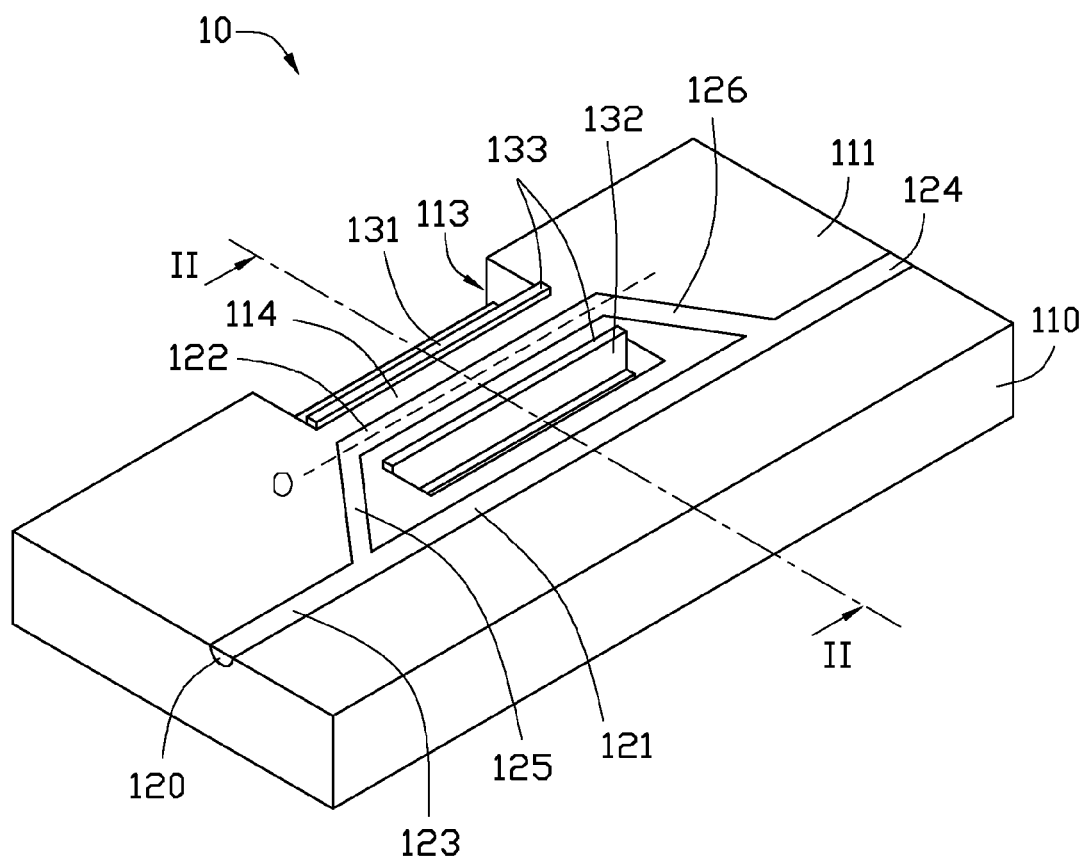
FIG. 1 is an isometric schematic view of an electro-optic modulator, according to an embodiment.
Figure 2:
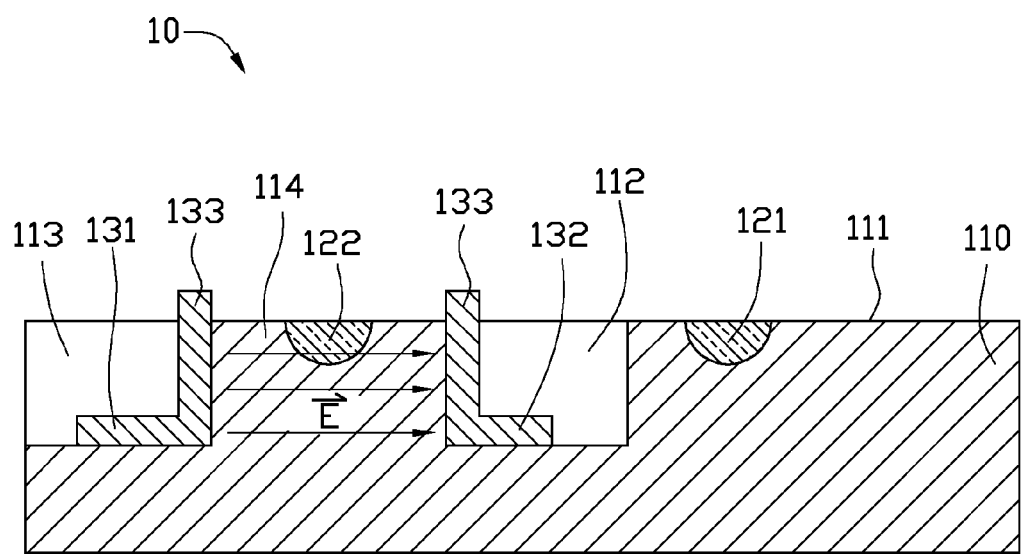
FIG. 2 is a cross-sectional view taken along a line II-II of FIG. 1.

Referring to FIGS. 1-2, an electro-optic modulator 10, according to an embodiment, includes a substrate 110 and a Y-shaped waveguide 120. The substrate 110 includes a top surface 111. The Y-shaped waveguide lens 120 is formed in the top surface 111 by high temperature diffusion technology. The Y-shaped waveguide 120 includes a non-modulated branch 121 and a modulated branch 122. The substrate 110 defines a first groove 112 in the top surface 111 separating the non-modulated branch 121 and the modulated branch 122.

Crosstalk between lightwaves traversing the non-modulated branch 121 and traversing the modulated branch 122 can be avoided as the lightwaves cannot cross the first groove 112.

The substrate 110 is made of lithium niobate (LiNbO$_3$) crystal to increase a bandwidth of the electro-optic modulator 10, the LiNbO$_3$ crystal having a high response speed.

The first groove 112 is deeper than the depth of either the non-modulated branch 121 or the modulated branch 122 to create complete separation between the non-modulated branch 121 and the modulated branch 122. Thus, prevention of the crosstalk is more effective.

In addition to the non-modulated branch 121 and the modulated branch 122, the Y-shaped waveguide 120 includes an input section 123 and an output section 124. The non-modulated branch 121 and the modulated branch 122 both branch from the input section 123 and are converged into the output section 124. The input section 121, the non-modulated branch 121, and the output section 122 cooperatively form a straight passage for the lightwaves. The modulated branch 122 is substantially parallel with the non-modulated branch 121. The Y-shaped waveguide 120 also includes a branching section 125 and a converging section 126 which obliquely connect the modulated branch 122 to the input section 123 and to the output section 124 respectively. A divergent angle between the branching section 125 and the non-modulated branch 121 is substantially equal to the angle of divergence between the converging section 126 and the non-modulated branch 121.

The electro-optic modulator 10 also includes a pair of electrodes 131, 132, the pair of electrodes 131, 132 flanking the modulated branch 122. As such, a modulating electric field $\vec{E}$, generated by the electrodes 131, 132 when a modulating voltage is applied thereto, interacts with the modulated branch 122, and change an effective refractive index of the modulated branch 122, and alters a phase of the lightwaves traversing the modulated branch 122.

The substrate 110 also defines a second groove 113 in the top surface 111 at a side of the modulated branch 122 opposite to the first groove 112, leaving a ridge 114 between the first groove 112 and the second groove 113. The modulated branch 122 is located in or on the ridge 114. The first groove 112 and the second groove 113 are symmetrical about a central axis O of the modulated branch 122 (see FIG. 1).

The electrodes 131, 132 are respectively positioned in the first groove 112 and the second groove 113. Each of the electrodes 131, 132 includes a plate portion 133 extending up from the bottom of the ridge 114 (i.e., the bases of the first groove 112 and the second groove 113) along a direction that is substantially perpendicular to the top surface 111. Each of the plate portions 133 is higher than the bridge 114 and they thus protrude out of the top surface 111. As such, substantially the strongest portion of the modulating electric field $\vec{E}$ passes through any cross section of the modulated branch 122. A field interaction factor Γ, which quantifies a strength of non-linear electric-optic interaction of the electric modulating field $\vec{E}$, and an optical field in the modulated branch 122 in any cross section of the modulated branch 122, approach the maximum value, as the field interaction factor Γ is proportional to any overlap between the electric modulating field $\vec{E}$ and the optical field in any particular cross section of the modulated branch 122.

According to theory of electro-optic effect:

$$V_\pi = k \frac{\lambda G}{n^3 r \Gamma L},$$

wherein $V_\pi$ is a half amplitude of the modulating voltage, which is proportional to power consumption of the electro-optic modulator 10, k is a constant coefficient, λ is a working wavelength of the lightwaves, G is a gap between the non-modulated branch 121 and the modulated branch 122, n is an effective linear part of the refractive index of the crystal substrate 110, r is an electro-optic coefficient of the substrate 110 of a crystal axis parallel with the electric modulating field $\vec{E}$, and L represent a length of the modulated branch 122. That is, the power consumption of the electro-optic modulator 10 is inversely proportional to the field interaction factor Γ, and is reduced to the minimum value as the field interaction factor Γ approaches the maximum value.

An exemplary method for manufacturing the electro-optic modulator 10 can be implemented by the following steps S01-S03.

In step S01, the substrate 110 is provided.

In step S02, the first groove 112 is defined in the top surface 111 by, for example, a wet etching technology using hydrofluoric acid.

In step S03, the Y-shaped waveguide 120 is formed in the top surface 111 using the high temperature diffusion technology. The non-modulated branch 121 and the modulated branch 122 are positioned at two sides of the first groove 112. In detail, a layer of titanium of a thickness about 700 nanometers and of a specific pattern corresponding to the Y-shaped waveguide 120 in shape, size, and position, is deposited on the top surface 111 by, for example, photolithography technology. Then, the titanium is subjected to high-temperature diffusion, carried out at about 1020 degrees Celsius, to form the Y-shaped waveguide 120 having a semicircular cross section.

The method can also include a step S02a between the steps S01 and S02.

In step S02a, the second groove 113 is defined in the top surface 111 by, for example, wet etching.

The method can further include a step S04 after the step S03.

In step S04, the electrodes 131, 132 are formed on the substrate 110 by, for example, evaporation or sputtering techniques.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the possible scope of the disclosure but do not restrict the scope of the disclosure.

What is claimed is:

1. An electro-optic modulator, comprising:
    a substrate having a top surface;
    a Y-shaped waveguide formed in the top surface and comprising a non-modulated branch and a modulated branch, wherein the substrate defines a first groove in the top surface between the non-modulated branch and the modulated branch, the first groove spacing the non-modulated branch and the modulated branch; and
    a pair of electrodes arranged at two sides of the modulated branch and opposite to each other, and configured to generate modulating electric field to the modulated branch.

2. The electro-optic modulator of claim 1, wherein the substrate is made of lithium niobate crystal.

3. The electro-optic modulator of claim 1, wherein the first groove is deeper than the non-modulated branch or the modulated branch to entirely space the non-modulated branch and the modulated branch.

4. The electro-optic modulator of claim 1, wherein the Y-shaped waveguide comprises an input section, an output section, a branching section, and a converging section, the non-modulated branch and the modulated branch are branched from the input section and converge into the output section, all of the input section, the non-modulated branch, and the output section cooperatively form a straight passage for the lightwaves, the modulated branch is substantially parallel with the non-modulated branch, the branching section and the converging section obliquely connect the modulated branch to the input section and the output section, respectively, and a divergent angle between the branching section and the non-modulated branch is substantially equal to a divergent angle between the converging section and the non-modulated branch.

5. The electro-optic modulator of claim 1, wherein the substrate defines a second groove in the top surface at a side of the modulated branch opposite to the first groove, leaving a ridge between the first groove and the second groove, the modulated branch is located at the ridge.

6. The electro-optic modulator of claim 5, wherein the first groove and the second groove are symmetrical about a central axis of the modulated branch.

7. The electro-optic modulator of claim 5, wherein the electrodes are positioned in the first groove and the second groove, respectively, each of the electrodes comprises a plate portion extending up from the bottom of the ridge along a direction that is substantially perpendicular to the top surface.

8. The electro-optic modulator of claim 7, wherein each of the plate portions is higher than the ridge and thus protrudes out of the top surface.

9. A method for manufacturing an electro-optic modulator, the method comprising:
    providing a substrate, the substrate including a top surface;
    defining a first groove in the top surface;
    forming a Y-shaped waveguide in the top surface, the Y-shaped waveguide including a non-modulated branch and a modulated branch which are positioned at two sides of the first groove and opposite to each other; and
    forming a pair of electrodes in the top surface at two sides of the modulated branch, the pair of electrodes being configured to generate modulating electric field to the modulated branch.

10. The method of claim 9, wherein the first groove is defined by a wet etching technology using hydrofluoric acid.

11. The method of claim 9, wherein the Y-shaped waveguide is formed by:
    depositing a layer of titanium of a thickness about 700 nanometer and a specific pattern corresponding to the Y-shaped waveguide in shape, size, and position on the top surface; and
    applying a diffusion process to the titanium at a temperature of about 1020 degrees Celsius to form the Y-shaped waveguide having a semicircular cross section.

12. The method of claim 9, further comprising:
    defining a second groove in the top surface at a side of the modulated branch opposite to the first groove after the first groove is defined but before the Y-shaped waveguide is formed.

13. The method of claim 12, wherein the first groove and the second groove are symmetrical about a central axis of the modulated branch.

14. The method of claim 12, wherein one of the pair of electrodes is positioned in the first groove and another one of the pair of electrodes is positioned in the second groove, each of the electrodes comprises a plate portion extending up from the bottom of the ridge along a direction that is substantially perpendicular to the top surface.

15. The method of claim 14, wherein each of the plate portions extends higher than the ridge and protrudes out of the top surface.

\* \* \* \* \*